(No Model.) 3 Sheets—Sheet 1.
G. CLARKE.
MANUFACTURE OF CASES AND STAPLES OF SOCKET BOLTS FOR DOORS.
No. 470,985. Patented Mar. 15, 1892.
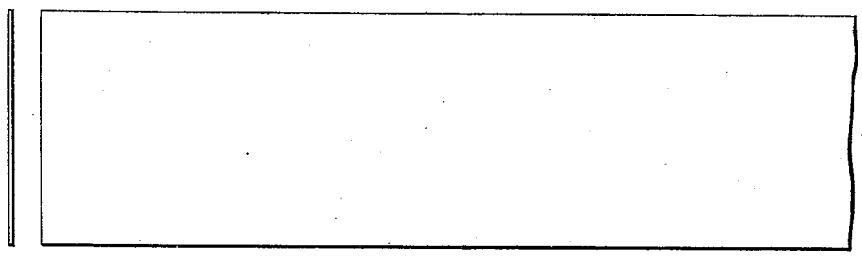
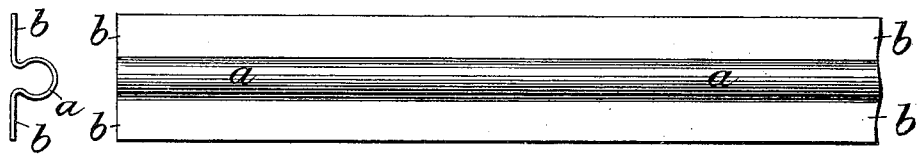
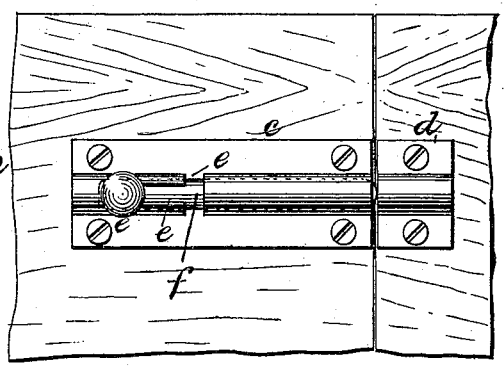
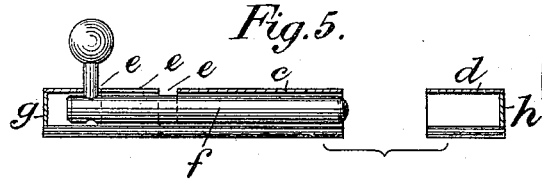
Witnesses;—
George Shaw
Richard Skerrett
Inventor;—
George Clarke (No Model.) 3 Sheets—Sheet 2.
G. CLARKE.
MANUFACTURE OF CASES AND STAPLES OF SOCKET BOLTS FOR DOORS.
No. 470,985. Patented Mar. 15, 1892.
*Fig. 6.*
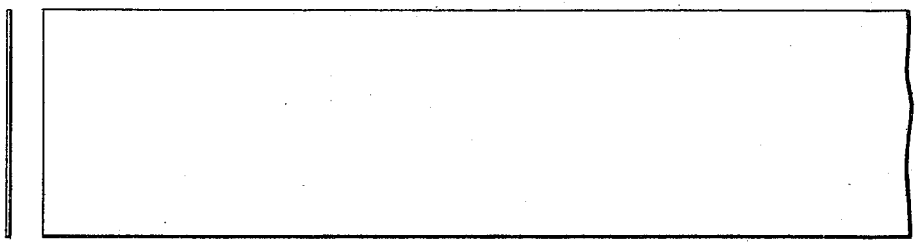
*Fig. 7ᴬ.*      *Fig. 7.*
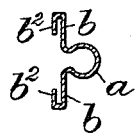 
*Fig. 8.*
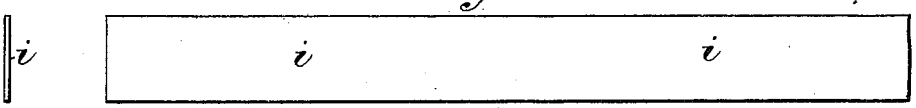
*Fig. 9ᴬ.*      *Fig. 9.*
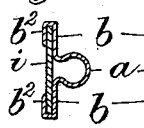 
*Fig. 9ᴮ.*
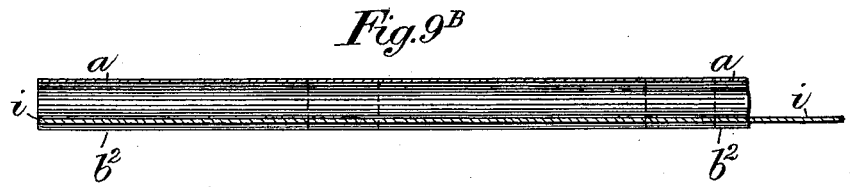
Witnesses:— George Shaw, Richard Skerrett
Inventor:— George Clarke
THE NORRIS PETERS CO., PHOTO-LITHO., WASHINGTON, D. C.

(No Model.) 3 Sheets—Sheet 3.
G. CLARKE.
MANUFACTURE OF CASES AND STAPLES OF SOCKET BOLTS FOR DOORS.
No. 470,985. Patented Mar. 15, 1892.
Fig. 10ᴬ.  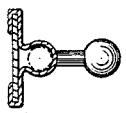  Fig. 10. 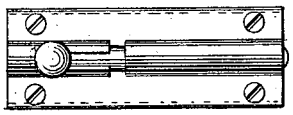  Fig. 12.   Fig. 12ᴬ. 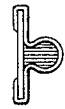
Fig. 10ᴮ.   Fig. 12ᴮ. 
Fig. 11.
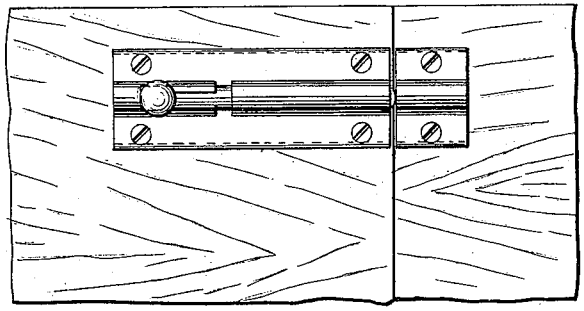
Witnesses:—
George Shaw
Richard Skerrett
Inventor:—
George Clarke

UNITED STATES PATENT OFFICE.

GEORGE CLARKE, OF HANDSWORTH, ASSIGNOR TO EVERED & COMPANY, LIMITED, OF LONDON, BIRMINGHAM, AND SMETHWICK, NEAR BIRMINGHAM, ENGLAND.

MANUFACTURE OF CASES AND STAPLES OF SOCKET-BOLTS FOR DOORS.

SPECIFICATION forming part of Letters Patent No. 470,985, dated March 15, 1892.

Application filed December 8, 1891. Serial No. 414,424. (No model.) Patented in England November 26, 1890, No. 19,243.

*To all whom it may concern:*

Be it known that I, GEORGE CLARKE, of Handsworth, England, a subject of the Queen of Great Britain, have invented certain new and useful Improvements in the Manufacture of the Cases or Barrels and Staples of Socket-Bolts for Doors and other Articles, (for which I have obtained Letters Patent of Great Britain No. 19,243, dated November 26, 1890;) and I do hereby declare that the following is a full, clear, and exact description of the invention, which will enable others skilled in the art to which it appertains to make and use the same.

My invention has reference to the manufacture of the cases or barrels and staples of bolts for doors and other articles from sheet metal; and it consists of the improvements in the said manufacture hereinafter described.

In making the case or barrel of a bolt according to my invention I take a flat strip of sheet metal—brass, for example—and by the drawing process I give to the middle of the said strip a nearly-tubular figure, the outer portions of the said strip being preserved in the same plane. The strip of metal drawn as described has in cross-section the figure or nearly the figure of the barrel and plate of a door-bolt. Where it is desired to give the plate of the bolt greater strength than that of the barrel, I effect that object by the addition of a flat strip of metal, preferably iron, to the plate made as described. In this case I employ in the formation of the barrel and plate a strip of metal of somewhat greater width than that I employ when the plate has not to be strengthened, and I connect the strengthening-strip of iron to the under side of the plate by turning over the edges of the plate upon the strengthening-strip. The said strengthening-strip is thereby firmly secured to the plate and virtually constitutes a part of the plate. The strip of sheet metal, fashioned by the drawing process and where desired strengthened, as herein described, is cut into pieces of the lengths required for cases or barrels and staples, and the said pieces are finished in the usual way—that is to say, in the case or barrel the required longitudinal and cross slots for the handle of the rod or bolt proper to slide in are made, and in the plates of the bolt-case and staple holes are made for the attaching-screws to pass through.

I will now proceed to describe, with reference to the accompanying drawings, the manner in which my invention is to be performed.

Figures 1, 2, 2ᴬ, 3, 3ᴬ, 4, and 5 illustrate the manufacture of the case or barrel and staple of a socket-bolt according to the first-described method; and Figs. 6, 7, 7ᴬ, 8, 9, 9ᴬ, 9ᴮ, 10, 10ᴬ, 10ᴮ, 11, 12, 12ᴬ, and 12ᴮ illustrate the manufacture of the case or barrel and staple of a socket-bolt, according to the second-described method.

In making the cases or barrels and staples of socket-bolts according to the first-described method I take a long strip of sheet-brass of the kind represented in Fig. 1, and by a drawing process, effected by the use of one or more dies fixed in a draw-bench, I give to the said strip the form represented in plan in Fig. 2 and end elevation in Fig. 2ᴬ—that is to say, I give to the middle of the strip a trough form, (marked $a$,) the marginal parts $b\ b$ from which the plate of the case or barrel is to be made being preserved in the same plane as represented. By a further drawing operation the trough $a$ in the middle of the strip is closed so as to give a cylindrical figure to it, and the plate parts $b\ b$ on either side of it are brought together or nearly in contact, as represented in plan in Fig. 3 and end elevation in Fig. 3ᴬ. The strip of metal thus drawn has in cross-section the figure of the case or barrel and plate of a socket-bolt.

The strip of metal, Figs. 3 and 3ᴬ, fashioned by the drawing process is cut transversely by sawing into pieces or lengths suitable for the cases or barrels and staples of socket-bolts, as indicated by the dotted lines in Fig. 3, the pieces or lengths marked $c\ c$ of the strip being suitable for the cases or barrels and the shorter pieces or lengths marked $d\ d$ for the staples of bolts.

Fig. 4 represents in plan, and Fig. 5 in longitudinal section, a socket-bolt, the case or barrel and staple of which are made from the cut-off pieces of the drawn strip described.

In converting the cut-off pieces or lengths into the cases or barrels of the bolts each of the cut-off pieces $c$ is provided with the longitudinal and cross slots at $e\,e$ for the handle of the rod or bolt proper $f$ to work in. One end of the case or barrel is closed at $g$, and countersunk holes for the fixing-screws are made in the plate of the case. The strips $d$ to form the staples are each closed at one end $h$ and countersunk holes made in the plate part for the fixing-screws.

In making cases or barrels and staples of socket-bolts according to the second-described method, so as to give the plate of the bolt greater strength than that of the case or barrel, I proceed in the following manner: I take the broad strip of sheet-brass, Fig. 6, and by one or more drawing operations I give to the said broad strip the form represented in plan in Fig. 7 and cross-section in Fig. $7^A$—that is, I give to the middle of the strip the trough form $a$ for the barrel or case of the bolt, leaving unoperated upon the marginal parts $b\,b$ of the strip to form the plate of the finished case or barrel; but the edges of the strip by the drawing operation or operations are bent at right angles to the parts $b\,b$ and afterward parallel to the parts $b\,b$, as represented at $b^2\,b^2$. There is thereby formed a drawn strip having in cross-section the figure of the barrel and plate of a socket-bolt, and having on the under side and along the edges of the plate $b\,b$ longitudinal seats at $b^2\,b^2$. I next take the strengthening-strip of iron (represented in Fig. 8) and insert it by a sliding motion in the longitudinal seats or edges $b^2\,b^2$ of the drawn strip, Figs. 7 and $7^a$, and, preferably, by a drawing operation I close the edges or seats $b^2\,b^2$ upon the strengthening-strip, as represented in plan in Fig. 9, cross-section in Fig. $9^A$, and longitudinal section in Fig. $9^B$, where the barrel part of the strip is marked $a$, the plate $b$, and the strengthening-strip $i$. By thus closing the parts or seats $b^2\,b^2$ on the strengthening-strip $i$ it is firmly secured to the plate $b\,b$ and virtually forms a part of the plate.

The compound strip, Figs. 9, $9^A$, and $9^B$, is cut transversely into pieces of the length required for the cases or barrels and staples of the bolts, as indicated in dotted lines and as hereinbefore described with respect to the unstrengthened strip, Figs. 3 and $3^A$, and the cut-off lengths or pieces are finished in the manner described with respect to Figs. 4 and 5.

Fig. 10 represents in plan, Fig. $10^A$ in end elevation, and Fig. $10^B$ in longitudinal section, a finished socket-bolt; and Fig. 11 represents the same with its staple made from strips or pieces having the sectional figure of the compound strip shown in Figs. 9, $9^A$, and $9^B$; and Figs. 12, $12^A$, and $12^B$ represent the finished staple detached.

Although I prefer to secure the strengthening-strip $i$ to the plate part of the drawn strip by a drawing operation, as described, yet the seats or edges $b^2\,b^2$ of the drawn strip may be closed upon the strengthening-strip $i$ by rolling, hammering, or otherwise.

Having now particularly described and ascertained the nature of my invention and the manner in which the same is to be performed, I declare that I claim as my invention—

1. Manufacturing the cases or barrels and staples of socket-bolts for doors and other articles by first fastening by a series of drawing operations a flat strip of sheet-brass or other ductile sheet metal or alloy into the figure in cross-section of the barrel and plate of a door-bolt and its staple, cutting the drawn strip transversely into pieces of the lengths required for the cases or barrels and staples and finishing the said cut-off pieces, so as to convert them into the cases or barrels and staples of socket-bolts, substantially as hereinbefore described, and illustrated in Figs. 1, 2, $2^A$, 3, $3^A$, 4, and 5 of the accompanying drawings.

2. Manufacturing the cases or barrels and staples of socket-bolts for doors and other articles from a compound or strengthened drawn strip of the kind hereinbefore described, and illustrated in Figs. 9, $9^A$, and $9^B$ of the accompanying drawings—that is to say, forming from a flat strip of sheet-brass or other ductile sheet metal or alloy by a drawing process a strip having in cross-section the figure of the barrel and plate of a bolt and its socket, together with turned-in edges or seats on the under side of the plate part and strengthening the said drawn strip at the plate part by a strengthening-strip of iron secured, preferably, by a drawing operation to the under side of the said plate part, the compound or strengthened strip being made into the cases or barrels and staples of socket-bolts, substantially as hereinbefore described, and illustrated in Figs. 6, 7, $7^A$, 8, 9, $9^A$, $9^B$, 10, $10^A$, $10^B$, 11, 12, $12^A$, and $12^B$ of the accompanying drawings.

GEORGE CLARKE. [L. S.]

Witnesses:
GEORGE SHAW,
RICHARD SKERRETT.